United States Patent [19]

Grimes et al.

[11] Patent Number: 5,425,831
[45] Date of Patent: Jun. 20, 1995

[54] OPTICAL FIBER CONNECTING METHOD

[75] Inventors: Gary J. Grimes, Thornton, Colo.; William R. Holland, Ambler, Pa.

[73] Assignee: AT&T Corp., Murray Hill, N.J.

[21] Appl. No.: 214,519

[22] Filed: Mar. 18, 1994

[51] Int. Cl.$^6$ .......................... G02B 6/12; B29C 65/48
[52] U.S. Cl. ..................................... 156/179; 156/176; 156/178; 156/293; 385/15
[58] Field of Search ............... 156/176, 178, 179, 293, 156/300; 385/15

[56] References Cited

U.S. PATENT DOCUMENTS

| | | | |
|---|---|---|---|
| 4,450,623 | 5/1984 | Burr | 29/850 |
| 5,259,051 | 11/1993 | Burack et al. | |
| 5,268,981 | 12/1993 | Shahid | 385/59 X |
| 5,292,390 | 3/1994 | Burack et al. | 385/76 X |

OTHER PUBLICATIONS

"Review of Fused Single-mode Coupler Technology," C. M. Ragdale et al., SPIE Fiber Optic Couplers, Connectors, and Splice Technology, vol. 479, 1984, pp. 2–8.
"Packaging of Optoelectronics and Passive Optics in a High Capacity Transmission Terminal," G. J. Grimes et al., IEEE 1993 Proceedings, 43rd Electronic Components & Technology Conference, Jun. 1–4, 1993, Orlando, Fla., pp. 718–724.

*Primary Examiner*—Jeff H. Aftergut
*Attorney, Agent, or Firm*—Roderick B. Anderson

[57] ABSTRACT

Optical fiber (12) extending from an optical coupler (11) is routed on a substrate layer (13) by first inserting the optical coupler in a device holder (16) having a slotted member (17). An opening in a substrate layer is made to match a cavity (19) in a support member (20). The device holder is inserted in the cavity (19) of the support member (20) and the substrate layer (13) is supported by the support member (20) such that the opening exposes the device holder (16). The optical fiber extending from the optical coupler is inserted into a slot of the slotted member (17) such that a bridging portion (21) of the fiber bridges a distance between the upper surface of the substrate layer (13) and the slotted member (17). The bridging portion of the optical fiber is engaged with a routing device, and the fiber is then muted on the upper surface of the substrate layer (13).

9 Claims, 2 Drawing Sheets

OPTICAL FIBER CONNECTING METHOD

TECHNICAL FIELD

This invention relates to methods and apparatus for making optical fiber interconnections and, more particularly, to methods for routing optical fibers that are connected to optical devices.

BACKGROUND OF THE INVENTION

The paper, "*Review of Fused Single-Mode Coupler Technology,*" C. M. Ragdale et al., *Proceedings of SPIE—The International Society for Optical Engineering, Fiber Optic Coupler, Connectors, and Splice Technology,* Vol. 479, pp. 2–8, May 1–2, 1984, incorporated herein by reference, is an example of the prior art describing optical couplers. Such couplers typically include two optical input ports and two optical output ports, each port connected to an optical fiber. Light energy entering either of the two input ports is divided in any of various prescribed fashions by the optical coupler and transmitted through either or both of the two output ports. When the optical couplers are made, it is customary to include optical fibers, sometimes known as "pigtails," connected to the two input and the two output ports.

The copending application of Holland, Serial No. 08/143,670, filed Nov. 1, 1993, incorporated herein by reference, describes a method for routing the optical fibers extending from a device. The apparatus described picks up the optical fiber, winds it on a reel and then routes the fiber on the surface of a substrate that has been covered with pressure-sensitive adhesive. After the fiber has been routed, the fibers are encapsulated with a thermoplastic sheet to stabilize them and to protect them from the environment, from the effects of rough handling, etc. The encapsulated fibers typically constitute an optical backplane used to interconnect electrical or optical subsystems. It would be desirable to adapt this technique to the routing of optical fibers extending from opposite ends of optical couplers in such a manner that the couplers and fibers are made part of a unitary optical backplane package in which the optical fibers extending from both ends of each coupler are routed in a desired manner, are encapsulated and protected from the environment, and are connectable to other apparatus.

SUMMARY OF THE INVENTION

In an illustrative embodiment of the invention, optical fiber extending from an optical coupler is routed on a substrate layer by first inserting the optical coupler in a device holder having a slotted member. An opening in a substrate layer is made to match a cavity in a support member. The device holder is inserted in the cavity of the support member and the substrate layer is supported by the support member such that the opening exposes the device holder. The optical fiber extending from the optical coupler is inserted into a slot of the slotted member such that a portion of the fiber bridges a distance between the upper surface of the substrate layer and the slotted member. The bridging portion of the optical fiber is engaged with a routing device, and the fiber is then routed on the upper surface of the substrate layer.

The routing allows the fiber to be directed to other locations for convenient connectorization in accordance with optical backplane technology. After the routing of fibers extending from both ends of the coupler, plastic cover lid members are bonded to the optical coupler and to the substrate layer, and an encapsulant layer is bonded over the cover lid members and the substrate layer to form a unitary package containing the optical coupler and the routed fiber. Thus, the optical coupler becomes an integral part of an optical backplane on which the fibers extending from it are routed and encapsulated.

These and other objects, features and benefits of the invention will be better understood from a consideration of the following derailed description taken in conjunction with the accompanying drawing.

DETAILED DESCRIPTION

Figure 1:
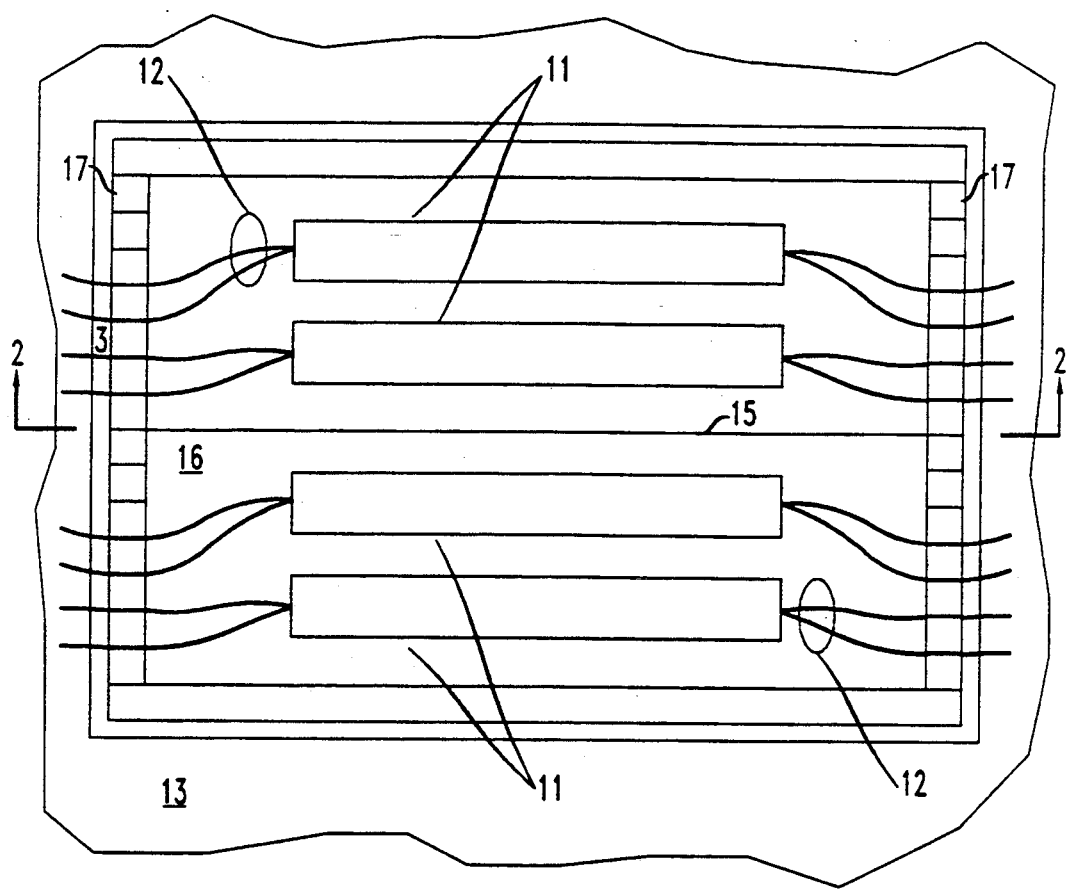
FIG. 1 is a schematic top view of part of a partially completed optical backplane in accordance with an illustrative embodiment of the invention.

The drawings are schematic in nature with, in some cases, the dimensions not being to scale. Referring now to FIG. 1, there is shown a plurality of optical couplers 11 each having a pair of optical fibers 12 extending from opposite ends thereof. Each optical coupler has two input ports and two output ports, its function being to allocate incoming optical energy from the two input ports to the two output ports. It is intended that the optical fibers extending from the opposite ends of the coupler should be connected to various other apparatus, not shown, of an optoelectronic system. Optical backplanes are admirably suited to this purpose, and optical backplane technology is employed to this end.

The optical couplers 11 are mounted within an opening in a flexible plastic substrate layer 13. The substrate layer is intended to support the various optical fibers 12 which are to be routed to appropriate locations on the substrate layer 13 and coupled through connectors and the like to external optoelectronic apparatus. In this manner, the substrate 13 may define an optical backplane within which the couplers 11 are integrated. Optical fiber 15 is shown as being connected to none of the optical couplers merely to illustrate that the optical backplane to be made may be used for making interconnections between other elements not including the optical couplers 11.

Figure 2:
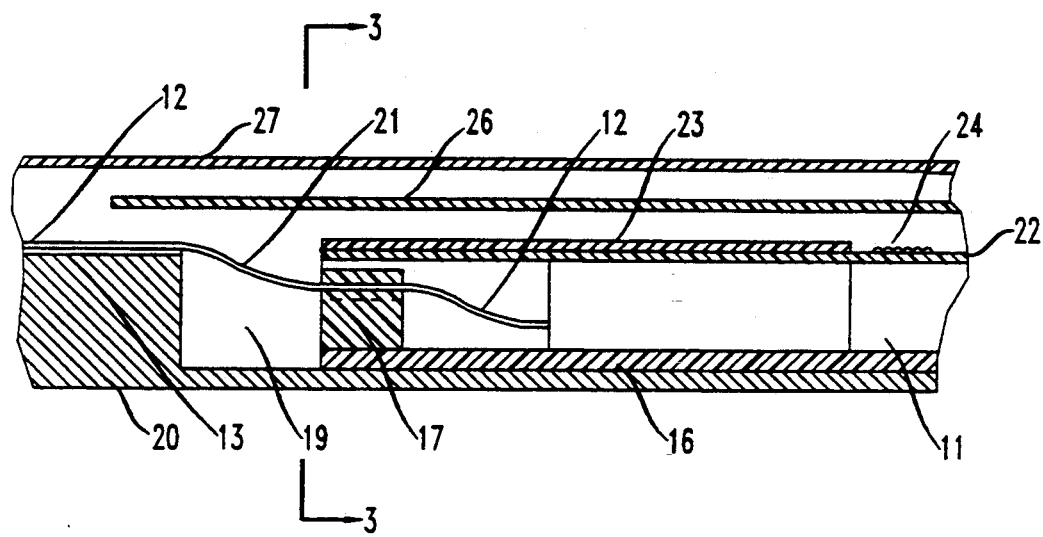
FIG. 2 is a fragmentary view taken along lines 2—2 of FIG. 1.
Figure 3:
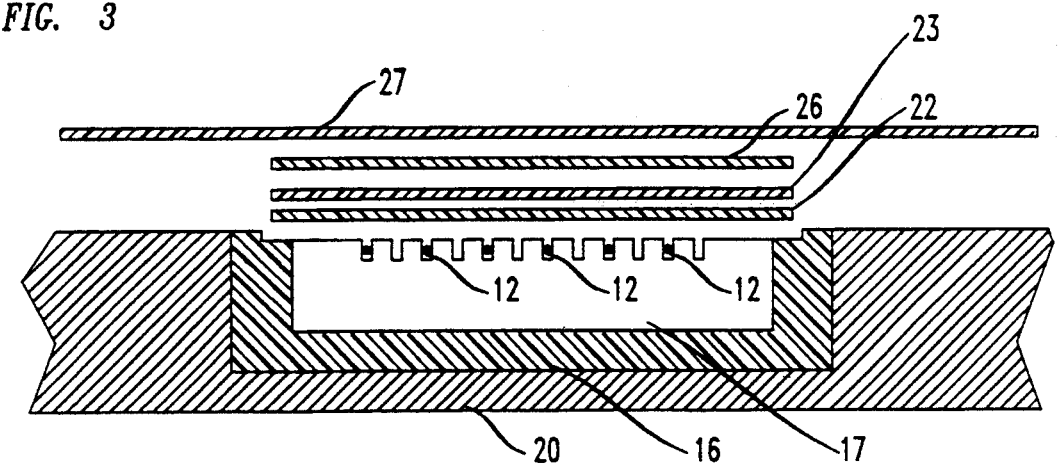
FIG. 3 is a fragmentary view taken along lines 3—3 of FIG. 2.

Referring to FIGS. 2 and 3, prior to routing of the optical fiber 12, the optical couplers 11 are mounted in a rigid device holder 16 having at one end a slotted member 17. The device holder in turn is mounted within a cavity 19 of a support member 20. The substrate layer 13 has an opening that matches the cavity 19 and it is placed over the support member 20 so as to expose the cavity 19, the device holder 16 and the couplers 11. Each of the fibers 12 is inserted into a slot of the slotted member 17 such that a bridging portion 21 of each fiber is suspended between the substrate layer 13 and the slotted member 17. First and second cover lid members 22 and 23 are next bonded to the device holder 16. As shown in FIG. 2, cover lid member 23 extends only part way along device 11 so that, if desired, optical fibers 24 can be routed over the tops of couplers 11. While only one end of the optical coupler 11 is shown in FIGS. 2 and 3, it is to be understood that similar structure is included at the other end for accommodating optical fibers extending from that end of the coupler, as shown in FIG. 1.

The upper surface of substrate layer 13 is covered with pressure-sensitive adhesive with the optical fibers 12 being routed on the upper surface by the technique described in the aforementioned Holland application. That apparatus uses a hook to grasp the optical fiber and wind it on a reel preparatory to routing. The bridging portion 21 is designed to provide a convenient location at which the hook can engage the fiber prior to routing. During routing, the fibers may, for example, be directed to input ports and output ports (not shown) of the substrate layer 13 which are to constitute connector regions of the optical backplane. The fibers may be doubled back upon the optical coupler to be located in the position shown by fibers 24 of FIG. 2. Various routing patterns, methods for testing, encapsulation methods, and other related matters are discussed in the U.S. patent of Burack et al., U.S. Pat. No. 5,259,051, granted Nov. 2,1993, incorporated by reference herein. Various methods by which optical fiber connectors can be attached to the output ports of the optical backplane are described, for example, in the copending application of Roll et al., Ser. No. 08/186,935, filed Jan. 27, 1994, incorporated by reference herein.

After the fibers 12 have been routed, a plastic member 26 is bonded to the cover lid member 23 such that it overlies a portion of the substrate 13 at opposite ends of the device holder 16 for the purpose of reducing stress on those portions of the fibers which are near the bridging portion 21. The substrate layer 13 is flexible and may be bent, and the member 26 limits the angle at which the underlying optical fibers can be bent due to such flexibility.

A thermoplastic encapsulant 27 is finally adhered over the entirety of the device holder 16 and the substrate layer 13, its primary purposes being to provide support for the integrated optical backplane, to stabilize the positions of the optical fibers 12, and to protect the fibers. The encapsulant is preferably applied with heat and pressure which causes it to flow and to adhere to the substrate layer 13, as is described in more detail in the aforementioned Burack et at. patent, or, alternatively, in the copending application of Burack et at. Ser. No. 08/201,966, filed Feb. 24, 1994, incorporated herein by reference.

Figure 4:
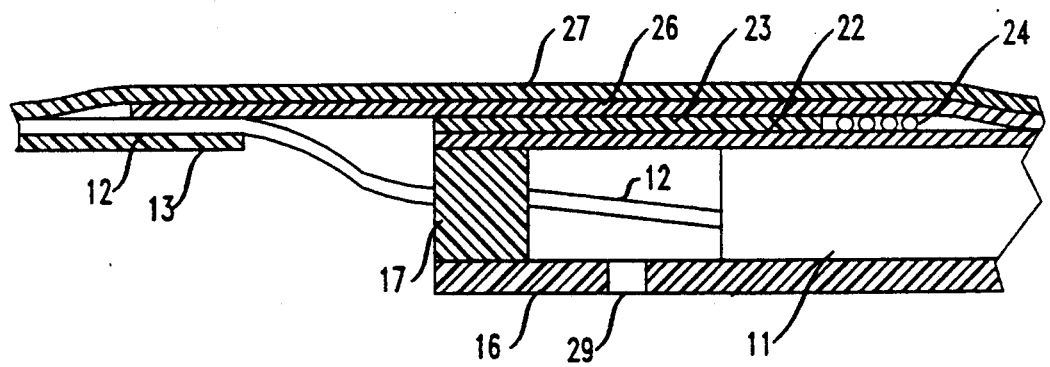
FIG. 4 is a fragmentary sectional view of a completed portion of an optical backplane in accordance with an illustrative embodiment of the invention.
Figure 5:
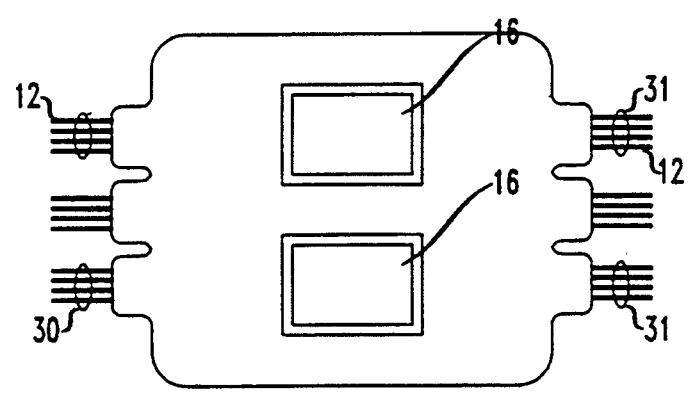
FIG. 5 is a view taken along lines 5—5 of FIG. 4.

After the encapsulation layer 27 has been applied, the entire package is removed from support member 20 and it thereafter constitutes a completed unitary optical backplane package, as shown in FIG. 4. The device holder 16 may contain a fill hole 29 which may be used to fill the space between the optical coupler 11 and the slotted member 17 with a plastic, such as a silicone, for providing additional structural support to the optical fiber 12. The pressure of the filling can be used to force silicon through the slots of slotted member 17 to provide a bead of silicone protecting the fiber portion extending between substrate layer 13 and slotted member 17. Notice that the optical fiber that has been routed is securely laminated between plastic layers 13 and 27. The cover lid members 22 and 23, and the member 26 securely bond the device holder 16 carrying the optical fiber couplers 11 to the encapsulation layer 27. As shown in FIG. 5, a plurality of device holders 16 may be bonded to a single substrate layer 13; consequently, the optical fibers routed from all of the couplers held by device holders 16 are part of a complex optical backplane having a plurality of input ports 30 and a plurality of output ports 31.

The copending Holland application shows how the fibers extending from an optical device can be routed from an input port of an optical backplane to an output port. The present invention describes how optical devices can be integrated within the optical backplane itself. It is believed that optical couplers so integrated into an optical backplane will become building blocks of future optoelectronic systems precisely because they are integrated between input and output ports of the optical backplane, as shown in FIG. 5. In this manner, the optical backplane not only directs, in a predetermined manner, light energy from input ports 30 to output ports 31 of the backplane, but it also allocates the various light inputs between the various output ports. Consequently, the flexibility of optical backplanes is increased so that they provide not only high-capacity transmission channels, but they can also calibrate the optical power transmitted by each channel. Clearly, devices other than optical couplers, such as optical amplifiers, could also be integrated within optical backplanes in this manner. Such devices may or may not have fibers initially extending from the ends thereof.

Device holder 16 is preferably made of a lightweight plastic, as are cover lid members 22 and 23 and member 26. Support member 20 may be made of aluminum. The encapsulant layer is preferably polyurethane, which is applied by heat and pressure which causes it to flow for adherence. Precise specifications of applied heat and temperature, plastic materials, adhesives and the like can be found in the references cited. It is to be understood, however, that such specifications are not intended to be limiting and that various materials and conditions other than those mentioned may be used, as would be clear to one skilled in the art. Various other embodiments and modifications may be made without departing from the spirit and scope of the invention.

We claim:

1. A method for routing an optical fiber extending from an optical device comprising the steps of:
    inserting the optical device in a device holder having a slotted member;
    inserting the optical fiber extending from the optical device into a slot of the slotted member;
    making an opening in a substrate layer to match a cavity in a support member;
    locating the substrate layer over the support member such that the opening exposes the cavity;
    inserting the device holder in the cavity such that a bridging portion of the fiber bridges a distance between an upper surface of the substrate layer and the slotted member;
    engaging the bridging portion of the optical fiber with a routing device;
    and routing the engaged optical fiber on the upper surface of the substrate layer.

2. The method of claim 1 wherein:
    the upper surface of the substrate layer is covered with a layer of pressure-sensitive adhesive;
    and the routing step comprises pressing the optical fiber against the pressure-sensitive adhesive.

3. The method of claim 1 wherein:

a plurality of optical devices are inserted in the device holder, each optical device having a, plurality of optical fibers, each optical fiber being inserted into a slot of a slotted member and being routed on the upper surface of the substrate layer.

4. The method of claim 3 further comprising the step of:

placing a planar cover lid over the device holder.

5. The method of claim 4 wherein:

with the device holder mounted in said cavity, the upper surface of the planar cover lid lies in approximately the same plane as the upper surface of the substrate layer;

after the fiber is routed, the cover lid and the upper surface of the substrate layer are substantially covered by and adhered to an encapsulating layer, thereby to integrate the device holder and the substrate layer;

and the integrated device holder and the substrate layer are removed from the support member.

6. The method of claim 1 wherein:

the optical device has optical fibers extending from both of two opposite ends thereof;

the fibers at one end being inserted in the slotted member, and the fibers at the other end being inserted in a second slotted member;

and the fibers extending from the second slotted member are engaged and routed on the upper surface of the substrate layer.

7. The method of claim 6 wherein:

a plurality of optical devices are inserted in the device holder, each optical device having optical fibers extending from opposite ends thereof, each optical fiber being inserted into a slot of a slotted member and being routed on the upper surface of the substrate layer.

8. The method of claim 7 further comprising the step of:

bonding a planar cover lid on an upper surface of the device holder such that the upper surface of the planar cover lid lies in approximately the same plane as the upper surface of the substrate layer;

after the fiber is routed, covering the upper surface of the substrate layer and the cover lid with an encapsulating layer and adhering the encapsulating layer to the cover lid and the substrate layer, thereby to integrate the device holder with the substrate layer;

and removing the device holder and the substrate layer from the support member.

9. The method of claim 8 wherein:

the optical devices are optical couplers.

* * * * *